United States Patent
Norgren

(10) Patent No.: US 7,739,470 B1
(45) Date of Patent: Jun. 15, 2010

(54) LIMIT ALGORITHM USING QUEUE DEPTH TO CONTROL APPLICATION PERFORMANCE

(75) Inventor: Matthew Norgren, Clinton, MA (US)

(73) Assignee: EMC Corporation, Hokinton, MA (US)

( * ) Notice: Subject to any disclaimer, the term of this patent is extended or adjusted under 35 U.S.C. 154(b) by 476 days.

(21) Appl. No.: 11/728,768

(22) Filed: Mar. 27, 2007

Related U.S. Application Data

(60) Provisional application No. 60/853,476, filed on Oct. 20, 2006.

(51) Int. Cl.
*G06F 12/06* (2006.01)
(52) U.S. Cl. .................. 711/168; 711/152; 709/224
(58) Field of Classification Search ............... 707/200; 711/168, 152, 154, 158; 709/224, 223, 220
See application file for complete search history.

(56) References Cited

U.S. PATENT DOCUMENTS

| | | | |
|---|---|---|---|
| 6,282,570 B1 * | 8/2001 | Leung et al. ............... | 709/224 |
| 6,453,346 B1 * | 9/2002 | Garg et al. ................. | 709/224 |
| 7,281,097 B1 * | 10/2007 | Lawson et al. ............ | 711/154 |
| 7,467,263 B2 * | 12/2008 | Ozaki et al. ................ | 711/154 |
| 2002/0174419 A1 * | 11/2002 | Alvarez et al. ............. | 717/168 |
| 2008/0028049 A1 * | 1/2008 | Taguchi et al. ............. | 709/220 |

FOREIGN PATENT DOCUMENTS

EP 1739558 A1 * 1/2007

OTHER PUBLICATIONS

"Using Navisphere QoS Manager in Oracle Database Deployments", *Applied Technology*, White Paper, © 2006 EMC Corporation, Nov. 2006, pp. 1-10.
"Navisphere Quality of Service Manager (NQM)", Applied Technology, White Paper, Copyright Oct. 2006, EMC Corporation. 13 pages.
U.S. Appl. No. 11/634,355, Lawson et al.

\* cited by examiner

*Primary Examiner*—Pierre-Michel Bataille
(74) *Attorney, Agent, or Firm*—Muirhead and Saturnelli, LLC

(57) ABSTRACT

Described are techniques for controlling performance of a data storage system. A performance goal specifying a limit for an I/O class is received. A number of requests of the I/O class to be processed concurrently to achieve the performance goal so that an observed performance value for the I/O class does not exceed the performance goal is determined. If the limit is a upper bound, the observed performance value falls within a range of one or more values equal to or less than the limit, and if the limit is a minimum value, the observed performance value falls within a range of one or more values equal to or greater than the limit.

20 Claims, 14 Drawing Sheets

US 7,739,470 B1

LIMIT ALGORITHM USING QUEUE DEPTH TO CONTROL APPLICATION PERFORMANCE

CROSS-REFERENCE TO RELATED APPLICATIONS

This application claims priority from U.S. Provisional Application No. 60/853,476, filed Oct. 20, 2006, QUALITY OF SERVICE MANAGER, which is incorporated herein by reference.

BACKGROUND

1. Technical Field

This application generally relates to data storage systems, and more particularly to techniques used with controlling the performance of the data storage systems in accordance with performance goals.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

Data storage systems and servers may be configured in a network arrangement referred to as a Storage Area Network (SAN). Each of the servers may have access to different physical devices, and/or logical portions thereof, included in the SAN. The data storage systems may process different types of requests from one or more applications executing on each of the servers or hosts connected to the data storage systems. It may be advantageous to process requests in a manner to achieve a desired performance goal. One technique may include controlling the I/O requests at the host side. However, this may require additional software being installed on each host. Another technique may include directly programming the data storage systems to process a certain number of requests of a particular type. If a performance goal is not met, the data storage system may be reprogrammed with revised numbers of the types of requests to process. The latter technique can be very time consuming and does not allow for changing environments and uses of the data storage systems.

SUMMARY OF THE INVENTION

In accordance with one aspect of the invention is a method for controlling performance of a data storage system comprising: receiving a performance goal specifying a limit for an I/O class; and determining a number of requests of the I/O class to be processed concurrently to achieve the performance goal so that an observed performance value for the I/O class does not exceed the performance goal, wherein if the limit is a upper bound, the observed performance value falls within a range of one or more values equal to or less than the limit, and if the limit is a minimum value, the observed performance value falls within a range of one or more values equal to or greater than the limit. A plurality of I/O classes may be defined, one or more of the plurality of I/O classes each having an associated performance goal. The method may also include performing the determining step for each of the one or more I/O classes to determine a number of requests to be serviced concurrently for each I/O class. The method may also include receiving performance data for a time period; determining the observed performance value for the time period; and evaluating, in accordance with the observed performance value, whether the performance goal is achieved. The performance goal may be a quantity representing one of: bandwidth, throughput, and response time. Response time may be the average time for a request to be serviced by the data storage system including any waiting time, bandwidth may be an average amount of data in connection with read and/or write I/O requests processed by the data storage system per unit of time, and throughput may be an average number of I/O requests serviced by the data storage system per unit of time. The method may also include determining whether the observed performance value is greater than the performance goal; if the observed performance value is greater than the performance goal, decreasing the number of requests of the I/O class to be processed concurrently. If no I/O requests of the I/O class had to wait to be serviced, the number of requests of the I/O class to be processed concurrently may be selected to be half of the current number of the requests to be processed concurrently for the I/O class. If one or more I/O requests of the I/O class had to wait to be serviced, a current value, current queue depth, of the number of requests of the I/O class to be processed concurrently, may be adjusted to produce a new queue depth represented as: new queue depth=current queue depth*(performance goal/observed performance value). The number of requests of the I/O class to be processed concurrently to achieve the performance goal may be selected from a range of values including at least one value representing a partial queue depth, the partial queue depth indicating that at most one I/O request of the I/O class is serviced at a time and there is at least one point in time during a defined time period at which there is no I/O request of the I/O class being serviced. The partial queue depth may be implemented by inserting one or more delays between a first time and a second time when an I/O request of the I/O class is serviced, wherein if a first partial queue depth is smaller than a second partial queue depth, the first partial queue depth results in a longer delay than the second partial queue depth. An amount of delay for a partial queue depth may be determined in accordance with an average service time for processing an I/O request of the I/O class. The method may also include determining whether the observed performance value is greater than the performance goal; and if the observed performance value is not greater than the performance goal, increasing the number of requests of the I/O class to be processed concurrently if the observed performance value for the I/O class does not fall within the range of one or more values equal to or less than the performance goal and at least one I/O request of the I/O class had to wait to be processed.

A current value of the number of requests of the I/O class to be processed concurrently may be represented as current queue depth, and the current queue depth may be increased to generate a new queue depth represented as: new queue depth=current queue depth+{[current queue depth*(performance goal/current performance)]−current queue depth}*damping coefficient, wherein the damping coefficient is a numeric value affecting an increase to the current queue depth. The number of requests of the I/O class to be processed concurrently to achieve the performance goal may be selected from a range of values including at least one value representing a partial queue depth, the partial queue depth indicating that at most one I/O request of the I/O class is serviced at a time and there is at least one point in time during a define a time period at which there is no I/O request of the I/O class being serviced. The partial queue depth may be implemented by inserting one or more delays between a first time and a second time when an I/O request of the I/O class is serviced, wherein if a first partial queue depth is smaller than a second partial queue depth, the first partial queue depth results in a longer delay than the second partial queue depth. An amount of delay for a partial queue depth may be determined in accordance with an average service time for processing an I/O request of the I/O class.

In accordance with another aspect of the invention is a data storage system comprising executable code stored on a computer readable medium for controlling performance of the computer readable medium comprising executable code stored thereon for: receiving a performance goal specifying a limit for an I/O class; determining a number of requests of the I/O class to be processed concurrently to achieve the performance goal so that an observed performance value for the I/O class does not exceed the performance goal, wherein if the limit is a upper bound, the observed performance value falls within a range of one or more values equal to or less than the limit, and if the limit is a minimum value, the observed performance value falls within a range of one or more values equal to or greater than the limit; and adjusting the number of requests of the I/O class to be processed concurrently in accordance with subsequently observed performance values and the performance goal to maintain the performance goal.

In accordance with yet another aspect of the invention is a computer readable medium comprising executable code stored thereon for controlling performance of a data storage system, the computer readable medium comprising executable code for: receiving a performance goal specifying a limit for an I/O class; and determining a number of requests of the I/O class to be processed concurrently to achieve the performance goal so that an observed performance value for the I/O class does not exceed the performance goal, wherein if the limit is a upper bound, the observed performance value falls within a range of one or more values equal to or less than the limit, and if the limit is a minimum value, the observed performance value falls within a range of one or more values equal to or greater than the limit. Each of one or more different I/O classes may specify different limit values, and said executable code for determining may be executed for each of the one or more different I/O classes to determine a number of requests to be serviced concurrently for said each I/O class.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
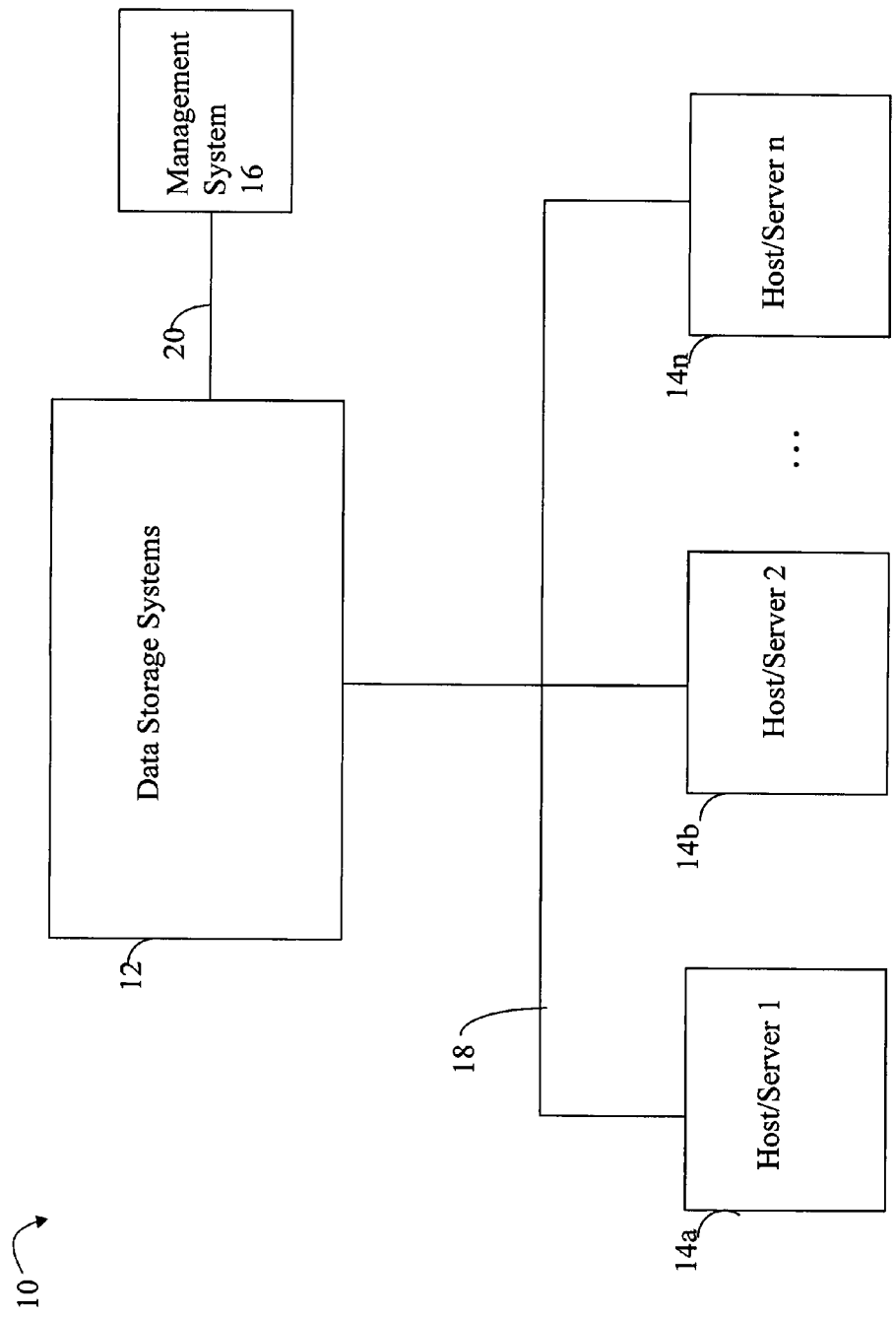
FIG. 1 is an example of an embodiment of a computer system that may utilize the techniques described herein.

Referring now to FIG. 1, shown is an example of an embodiment of a computer system that may be used in connection with performing the techniques described herein. The computer system 10 includes one or more data storage systems 12 connected to host systems 14a-14n through communication medium 18. The system 10 also includes a management system 16 connected to one or more data storage systems 12 through communication medium 20. In this embodiment of the computer system 10, the management system 16, and the N servers or hosts 14a-14n may access the data storage systems 12, for example, in performing input/output (I/O) operations, data requests, and other operations. The communication medium 18 may be any one or more of a variety of networks or other type of communication connections as known to those skilled in the art. Each of the communication mediums 18 and 20 may be a network connection, bus, and/or other type of data link, such as a hardwire or other connections known in the art. For example, the communication medium 18 may be the Internet, an intranet, network or other wireless or other hardwired connection(s) by which the host systems 14a-14n may access and communicate with the data storage systems 12, and may also communicate with other components (not shown) that may be included in the computer system 10. In one embodiment, the communication medium 20 may be a LAN connection and the communication medium 18 may be an iSCSCI or Fibre Channel connection.

Each of the host systems 14a-14n and the data storage systems 12 included in the computer system 10 may be connected to the communication medium 18 by any one of a variety of connections as may be provided and supported in accordance with the type of communication medium 18. Similarly, the management system 16 may be connected to the communication medium 20 by any one of variety of connections in accordance with the type of communication medium 20. The processors included in the host computer systems 14a-14n and management system 16 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage systems 12 are described herein in more detail, and may vary with each particular embodiment. Each of the host computers 14a-14n, the management system 16 and data storage systems may all be located at the same physical site, or, alternatively, may also be located in different physical locations. In connection with communication mediums 18 and 20, a variety of different communication protocols may be used such as SCSI, Fibre Channel, iSCSI, and the like. Some or all of the connections by which the hosts, management system, and data storage system may be connected to their respective communication medium may pass through other communication devices, such as a Connectrix or other switching equipment that may exist such as a phone line, a repeater, a multiplexer or even a satellite. In one embodiment, the hosts may communicate with the data storage systems over an iSCSCI or fibre channel connection and the management system may communicate with the data storage systems over a separate network connection using TCP/IP. It should be noted that although FIG. 1 illustrates communications between the hosts and data storage systems being over a first connection, and communications between the management system and the data storage systems being over a second different connection, an embodiment may also use the same connection. The particular type and number of connections may vary in accordance with particulars of each embodiment.

Each of the host computer systems may perform different types of data operations in accordance with different types of tasks. In the embodiment of FIG. 1, any one of the host computers 14a-14n may issue a data request to the data storage systems 12 to perform a data operation. For example, an application executing on one of the host computers 14a-14n may perform a read or write operation resulting in one or more data requests to the data storage systems 12.

The management system 16 may be used in connection with management of the data storage systems 12. The management system 16 may include hardware and/or software components. The management system 16 may include one or more computer processors connected to one or more I/O devices such as, for example, a display or other output device, and an input device such as, for example, a keyboard, mouse, and the like. A data storage system manager may, for example, view information about a current storage volume configuration on a display device of the management system 16.

An embodiment of the data storage systems 12 may include one or more data storage systems. Each of the data storage systems may include one or more data storage devices, such as disks. One or more data storage systems may be manufactured by one or more different vendors. Each of the data storage systems included in 12 may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage systems 12.

Each of the data storage systems may operate stand-alone, or may also be included as part of a storage area network (SAN) that includes, for example, other components such as other data storage systems. One or more data storage systems may also be directly attached to a host for use in connection with the techniques herein rather than in a SAN arrangement. These and other variations will be appreciated by those skilled in the art for use in connection with the techniques herein.

Each of the data storage systems of element 12 may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

Servers or host systems, such as 14a-14n, provide data and access control information through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single storage system may be accessed by multiple hosts allowing the hosts to share the data residing therein. An LV or LUN (logical unit number) may be used to refer to one of the foregoing logically defined devices or volumes.

The management system 16 may be a workstation serving as a management console and having a web server for connection to one or more of the data storage systems 12. The management system 16 may connect to the data storage systems 12 to use components included on the data storage systems described in following paragraphs for data storage system management functionality.

Quality of Service (QOS) software tools may allow users, such as customers, having a data storage system to monitor, measure, and control host-side application performance in accordance with performance goals. Such host-side applications may, for example, execute on a host connected to the data storage system. The techniques herein may be used by tools, such as the QOS software tools, to allow a customer to decide which host-side applications are allocated more of the available system resources of a data storage system. The software tools may include software components executing on the data storage system to monitor, limit and/or set performance goals for such applications issuing I/O requests to the data storage system. The management system 16 may be used to connect to the data storage system to utilize such software components executing thereon.

In following paragraphs, a limit technique is described that may be used to control performance of the data storage system. The limit technique is one of a variety of different control methods that may be used in the QOS application for controlling performance of the data storage system.

Figure 2:
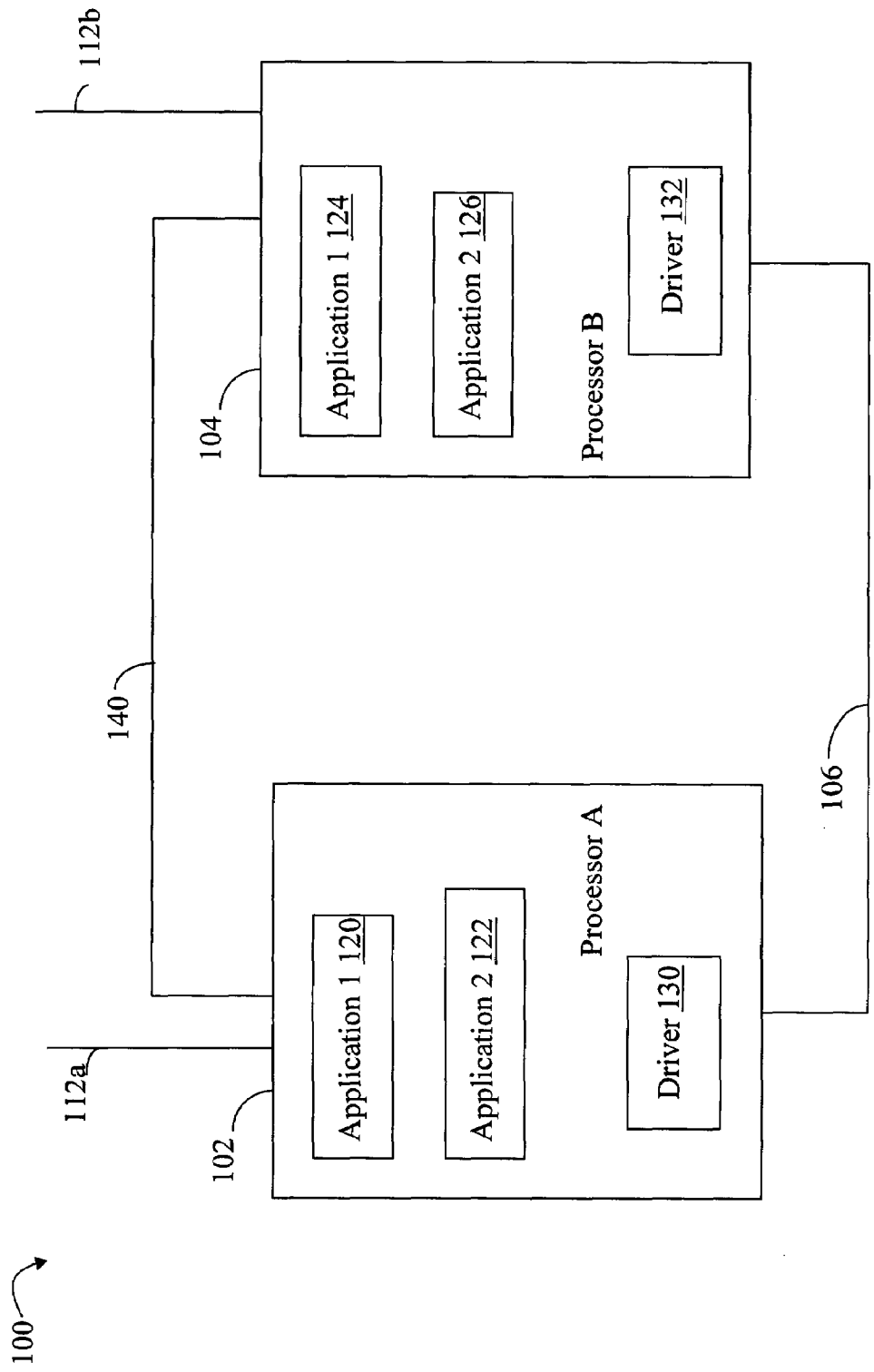
FIG. 2 is an example of a data storage system.

Referring now to FIG. 2, shown is a block diagram of elements that may be included in a data storage system. In the example 100, there are two storage processors 102, 104 although a data storage system may include a single storage processor as well as more than two storage processors for servicing received requests. In connection with techniques described herein, the two storage processors may control the operation of the data storage system. The processors may be configured to process data storage requests as received from the hosts, other data storage systems, management system, and other components connected thereto. Each of the processors 102, 104 may process received requests and operate independently and concurrently with respect to the other processor. In the example 100, each processor is illustrated as having one or more components (e.g., application 1, application 2, driver) executing thereon. An embodiment may have a same set of one or more software components executing on each processor so that either of the processors may service a received request.

The processors 102, 104 and software executing thereon (e.g., application 1, application 2, driver) may operate in accordance with a variety of different models. In one embodiment described herein, software executing on each of the processors 102, 104 may act as a peer to the other with respect to providing services and performing tasks. Each processor may be capable of providing a same set of services as the other processor such that either processor may service a request received by the data storage system.

In one embodiment, one of the applications executing on both processors may be a QOS software application as described above which provides for controlling performance of the data storage system in accordance with performance goals. The QOS software application, as well as other applications, may operate in accordance with a peer to peer model when processing requests in the multi-processor embodiment as illustrated in FIG. 2.

In the example 100, the application 1 (120, 124) may be the foregoing QOS application. Instances of application 1 executing on processors 102, 104 may communicate over connection 106 using lower-level components, such as drivers 130, 132. The connection 106 may be a bus or other communication connection to facilitate interprocessor communication between the drivers. The processors 102, 104 may also communicate over another connection 140. The connection 140 may be a TCP/IP connection over which an instance of application 1 on processor 102 may communication with another instance of application 1 on processor 104. Connection 140 may be used, for example, for application level communications between the processors as well as for communication with one or more components connected to the data storage system. The processors 102, 104 may also receive incoming requests from one or more external components, such as I/O requests from the hosts, over connections 112a and 112b, respectively.

The QOS application may use a feedback control technique to achieve goals defined for I/O classes. The I/O class is the logical grouping of I/O requests as received by the data storage system. Received I/O requests may be separated into one or more of the I/O classes. For example, an I/O class may be defined to profile I/O requests associated with a host-side application. Each I/O class may be defined in accordance with one or more attributes. A user may also define a performance goal for each I/O class. In one embodiment, an I/O class representing an application profile may specify attributes including, for example, the LUNs, I/O size(s) and/or I/O type for the application associated with the profile. The purpose of each I/O class is to allow the data storage system to identify the particular application associated with a received I/O request based on the attributes specified for each I/O class. It should be noted that an I/O class may generally correspond to any logical grouping of I/O requests and is not limited to those I/O requests associated with a particular application. For example, a single I/O class may correspond to I/O requests for multiple host applications, I/O requests designated for a particular device independent of host application, a portion of I/O requests of a single application, and the like. A user may specify a particular control method, such as the limit control method described in more detail herein, used to meet a goal specified for an I/O class. The control method may indicate the particular algorithm or technique used to regulate the I/O processing. The goal may be specified in terms of a value for a selected metric such as bandwidth, response time, or throughput.

A policy may also be another user defined grouping including all of the I/O classes that are monitored or controlled at a specific time. Only one policy may be run or enforced at a time. A schedule may specify criteria indicating which particular policy, including associated performance goals, is run or enforced at any particular time. For example, a daytime policy may be defined and an off-hours policy may be defined. The daytime policy may be run or enforced during defined daytime working hours. During other times on the weekend and weekdays, the off-hours policy may be run. Once a schedule defining when a particular policy will run is determined, the policy currently scheduled to run may be enforced. The results of running or enforcing a currently active policy may be monitored.

By setting performance goals for each of one or more I/O classes, users can limit the resources allocated to non-critical applications in order to reduce resource contention between the non-critical applications and other, more critical applications. Performance goals may be used to provide better quality of service (QOS) levels to the critical or more important applications. For example, during overnight hours or other non daytime working hours, a backup application may need to execute and complete a backup. The policy during these overnight hours may allocate sufficient resources to the backup application in order to ensure the backup completes. At other times, another policy may be enforced which results in the allocation of less resources to any executing backup application, and additional resources allocated to all other applications.

Figure 3:
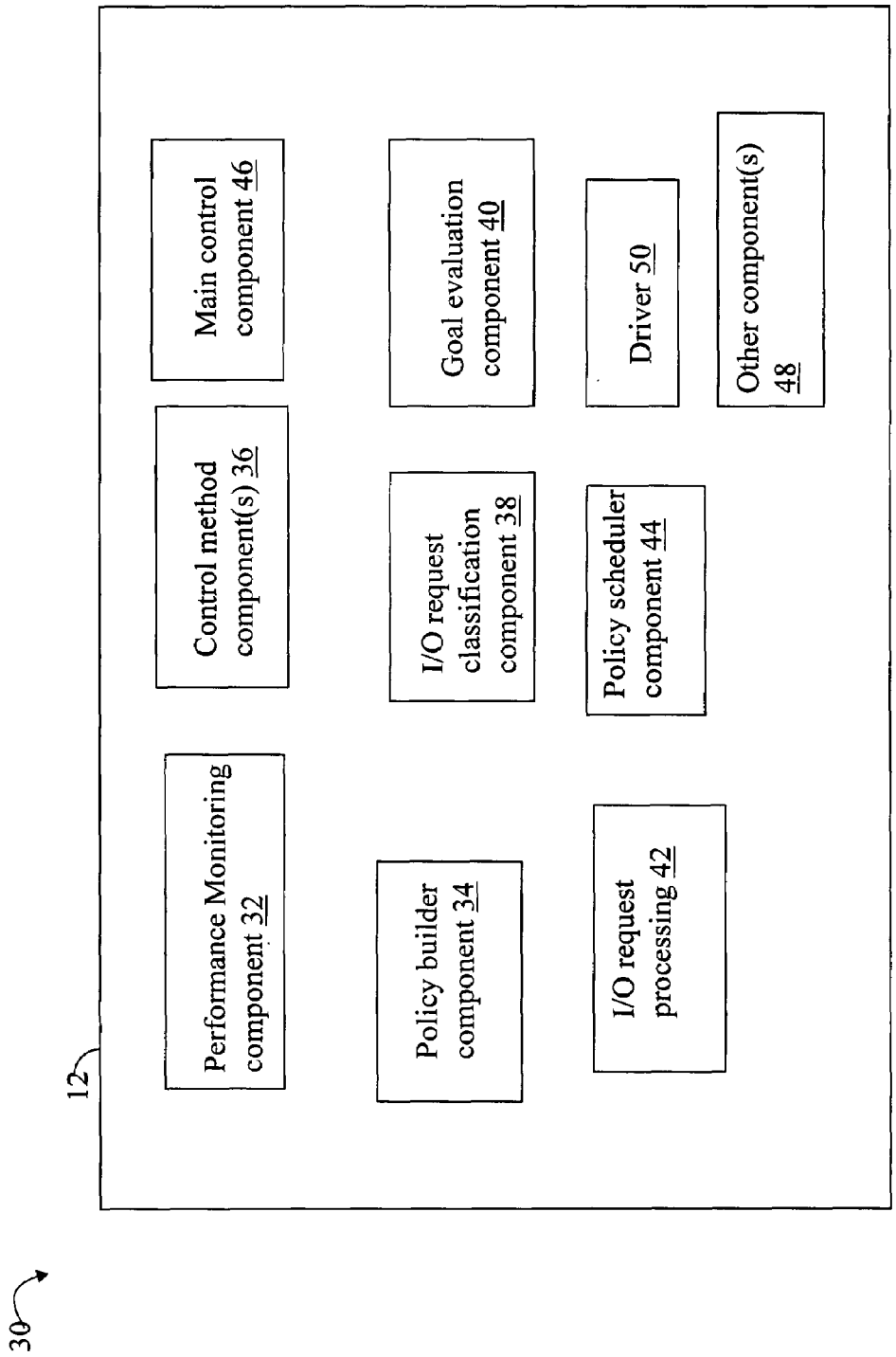
FIG. 3 is an example illustrating components that may be included in each storage processor.

Referring now to FIG. 3, shown are components that may be included in a data storage system. In a multiprocessor embodiment of a data storage system, a set of the components of the example 30 may execute on each processor.

The example 30 includes a performance monitoring component 32, a policy builder component 34, a control method component 36, an I/O classification component 38, a goal evaluation component 40, an I/O request processing component 42, a policy scheduler component 44, a main control component 46, a driver 50, and one or more other components 48.

The performance monitoring component 32 monitors the performance of the data storage system by sampling one or more performance metrics at defined time intervals. The performance metrics that may be included in one embodiment as described herein include response time, bandwidth, and I/O throughput. Response time may be defined as the average time that it takes for one request to pass through, or be serviced by, the data storage system including any waiting or delay time encountered, for example, due to policy enforcement of the techniques herein. Bandwidth may be defined as the average amount of data in connection with read and/or write I/O requests that is passed through the data storage system per unit of time, such as per second. Throughput may be defined as the average number of I/O requests (e.g., read and/or write requests) that are passed through or serviced by the data storage system per unit of time, such as per second.

The foregoing performance metrics may be monitored at various times with any single policy enforced, or without having any policy enforced. The latter may be useful when selecting performance goals so that a realizable performance goal may be specified for an I/O class or application. Additionally, the component 32 may be used in connection with gathering performance data as may be used by the one or more control methods used to control data storage system performance.

The policy builder component 34 may be used in connection with creating a policy. In one embodiment, the component 34 may provide an interface so that a user can interactively create a policy. As described herein, a policy may include one or more I/O classes used to profile and classify incoming I/O requests. Defining an I/O class may include specifying the one or more criteria for that particular class. The component 34 may provide for specifying a performance goal for each of one or more I/O classes. Additionally, a control method may be selected which is used to achieve that goal for one or more I/O classes. In one embodiment, a performance goal may be specified for an I/O class using any one of the three performance metrics (e.g., response time, bandwidth, or throughput) as described elsewhere herein. The service or performance goal may be a reasonable value selected in accordance with the particular data storage system and environment as well as the application and its level of importance and desired service goals. The performance goal may be specified using a numeric value. Along with specifying the performance goal, a control method may be selected identifying the technique for how the service goals are enforced for the defined I/O class.

The control method components(s) 36 include one or more components which implement one or more respective control methods. The control methods operate during enforcement or the running of a policy and may be implemented as executable code. Each control method component may include an implementation of a technique used to prioritize I/O requests within the data storage system to achieve defined service or performance level goals. One embodiment may include a limit control method described in more detail in following paragraphs. Each of the control methods implements a different technique and offers a different approach to achieve desired service level goals. As mentioned above, when creating an I/O class, a control method and associated performance goal may be specified. Based on the particular performance metric values measured by the component 32, the selected one of the control method component(s) 36 may accordingly adjust I/O priorities or use other means in order to achieve and/or maintain the performance goals. In one embodiment, control methods may include and utilize performance targets and limits. Limits may be characterized as a way to put rules in place to ensure that an application will not exceed a certain level of usage. Limits allow a user to throttle back an amount of resources given to one application in order to free up the resources for use by one or more other applications.

The limit control method may be used to limit performance of an I/O class to a certain level or amount of resources. I/O requests for an I/O class may be selected for servicing to keep I/O class performance at or below a defined limit value. The limit value may specify a goal for an I/O class as a numeric value of a performance metric such as, for example, bandwidth, throughput, response time, and the like, as may be included in an embodiment. For throughput and bandwidth, the performance goal may be a limit value specifying an upper bound so that the control method is used to achieve a goal in which the actual observed performance metric is at or below the limit value. For response time, the limit value may specify a minimum value and the control method is used to achieve a goal in which the actual observed performance metric is equal to or greater than the value. In accordance with techniques described herein, an embodiment of the limit control method may perform processing to achieve the performance goals, which in this case are limits, of the one or more I/O classes in a running policy by setting and adjusting queue depth for each I/O class. The queue depth may be defined as the number of I/O requests of an I/O class that may be serviced concurrently.

By applying a limit to an I/O class, other applications that share the same resources as the I/O class may see a performance increase since more resources are allocated for the other applications. In one embodiment, while the limit method tries to regulate I/O processing to stay at or below the limit, the limit method may also try to stay as close to the limit is possible without exceeding the limit for the throughput and bandwidth and without achieving an actual response time lower than the specified limit. The foregoing provides for maximizing an application's performance with an associated limit. Selection of a reasonable limit for an I/O class may be determined in accordance with previous observations of actual observed performance for I/O classes.

The limits control method may be used, for example, with non-critical or lower priority applications relative to other applications when the lower priority applications may have a resource contention with the other, higher priority, applications.

It should be noted that in connection with the techniques herein, all I/O classes included in a policy specify the same control method although different performance metrics may be specified for each I/O class.

The I/O request classification component 38 may be used to classify an incoming I/O request in accordance with I/O classes included in a policy which is currently running or being enforced. Incoming requests may be received and separated into one or more defined I/O classes of the currently running policy. In one embodiment, the received I/O requests may be placed in request queues corresponding to the different I/O classes of the currently active policy. The I/O requests may be subsequently retrieved from the queues for processing. It should be noted that after an incoming I/O request has been classified, it may be immediately serviced without having to wait in a queue, for example, if there are no outstanding I/O requests and there are resources available to service the incoming I/O request.

The goal evaluation component 40 is used in connection with a running policy in making a determination as to whether specified performance goals have been met. The I/O request processing 42 may include one or more components of the data storage system in connection with servicing the received I/O requests. The policy scheduler component 44 may be used to define a schedule of when one or more defined policies are enforced or run.

The main control component 46 may control the processing flow of the QOS application. The component 46 may invoke the selected control method for the currently running policy to specify initial settings or values affecting the processing rates of the different I/O classes. The component 46 may also interact with the components 32 and 36, respectively, to measure observed or actual performance with the initial settings in effect, and make adjustments to alter the processing rates using the selected control method. The adjustments are made to achieve and/or maintain the goals associated with each I/O class. The control methods operate during enforcement or the running of a policy and may be implemented as executable code. The component 46 may communicate with one or more of the components included in the example 200, directly or indirectly, when executing. The component 46 may communicate with driver 50 through a driver interface. The driver 50 may be characterized as a lower-level component. The driver 50 may facilitate communications over the connection 106 of FIG. 2 such as those with the other processor. The driver 50 may also communicate with one or more other lower level components not illustrated in FIG. 3, for example, to collect performance data when a policy is in force.

In one embodiment as described herein, the driver 50 may also be responsible for performing I/O request classification and placing I/O requests in appropriate queues while awaiting service so that the driver 50 may also perform the tasks of component 38 of FIG. 3. The driver 50 may also be responsible for initiating the process of servicing a received I/O request, selecting an I/O request from one or more queues of outstanding requests, and gathering performance data used in connection with techniques herein. In such an embodiment, the driver 50 may also perform some of the functionality as described herein of the performance monitoring component 32.

The other component(s) 48 may collectively refer to the one or more other components that may be on a data storage system. For example, the element 48 may include modules used to persistently store information, write to one or more log files, and the like, in connection with operation of the QOS application.

Figure 4:
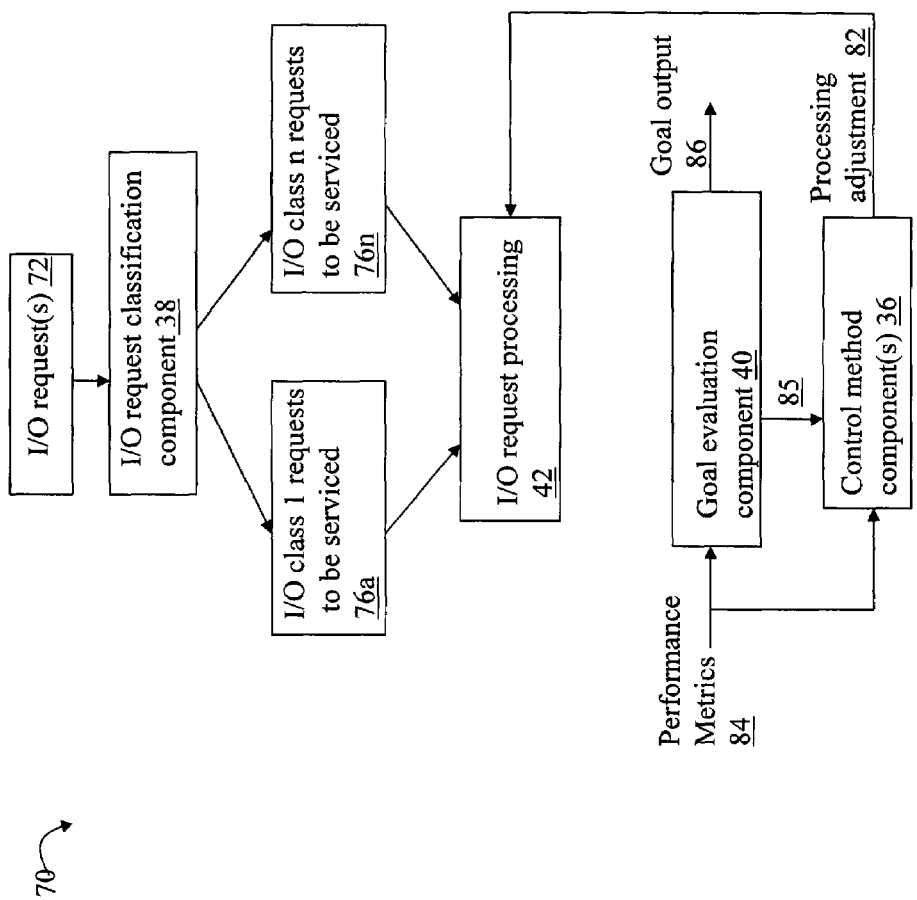
FIG. 4 is an example illustrating the data flow between functional components when a policy is running.

Referring now to FIG. 4, shown is an example illustrating the data flow between components with a policy running or being enforced. The example 70 illustrates an incoming I/O request 72 received by the data storage system which is input to the I/O request classification component 38 for classification into one of the defined I/O classes (e.g., denoted class 1 $76a$ through class n $76n$) for the policy currently being enforced. In this example, the I/O requests waiting to be serviced may be included in a structure, such as a list or other data structure known in the art for each I/O class, while waiting to be serviced by the data storage system. I/O request processing 42 selects one or more I/O requests for servicing by the data storage system. The requests selected for processing at various points in time are determined in accordance with the service or performance goals. As will be appreciated by those skilled in the art, any one of a variety of different techniques may be used in connection with initiating service of an I/O request from one or more of the queues $76a$-$76n$. One technique that may be used in an embodiment uses interrupts to trigger servicing of an I/O request from a queue at an appropriate time.

At various points in time, the goal evaluation component 40 may make a determination as to whether the currently specified performance goals are achieved. This may be made by comparing the performance goals previously specified for an I/O class in accordance with current performance metrics 84 measured or observed at the data storage system while a policy including the I/O class is running. As an output, the component 40 may generate a goal output signal 86 indicating whether the current performance goals are being met. The control methods 36 selected for the I/O classes of the policy in force may receive as inputs the current performance metrics 84 measured with the policy enforced, and information 85 from the goal evaluation component 40. The information 85 may include the goals defined for the I/O classes of the policy currently being enforced or running. In one embodiment, each I/O class of the running policy except the default class has an associated goal with a same control method. The control method components 36 may output processing adjustments 82 based on the currently defined performance goals and the current values of the relevant performance metrics 84. The processing adjustments 82 may affect subsequent I/O request processing 42. For example, if a control method for an I/O class includes a value used as a limit, the value may indicate a high watermark as a performance goal which should not be exceeded. In the event that the current performance metric exceeds this value, the corresponding control method component 36 may generate an adjustment 82 causing a decrease in the number of I/O requests of this class processed within a time period. Set forth in following paragraphs is additional detail of how an embodiment may control performance of the data storage system by adjusting the limit for each I/O class. One embodiment of the limit control method may adjust the queue depth for an I/O class in order to achieve the performance goal of the limit value. The control method components 36 may perform such evaluation at defined intervals such as when each new set of performance metrics 84 is obtained for the currently executing policy.

Figure 5:
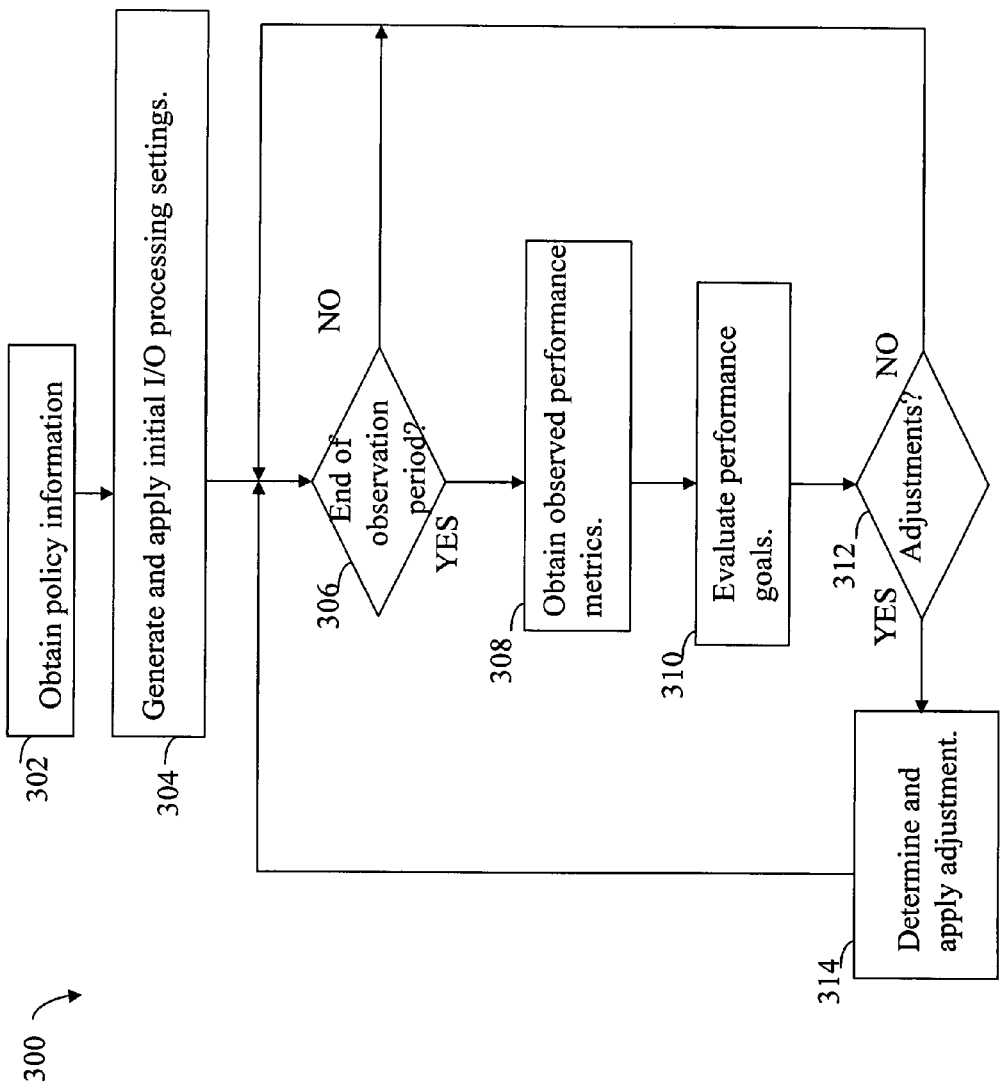
FIG. 5 is a flowchart of processing steps that may be performed by the components of the QOS application.

Referring now to FIG. 5, shown is a flowchart of processing steps that may be performed using the components of FIG. 3. At step 302, information regarding the policy currently being enforced is obtained. The policy information may be obtained, for example, by the main control component 46 querying the scheduler component 44 for the currently running policy, reading the policy information from a memory location containing current policy information, and the like. The policy information may include the various I/O classes, control method, performance goals for the I/O classes, attributes of each class, and the like. At step 304, the main control component 46 may invoke the appropriate control method, such as the limit control method, to select initial queue depths for the I/O classes of the currently running policy. The initial queue depth associated with each I/O class specifies the initial number of I/O requests that can be concurrently serviced for each I/O class. The limit control method embodiment described herein uses the queue depth to control the I/O processing rate for each I/O class. Once the initial queue depth settings have been determined, they are applied for use with the current I/O classes. The main control component 46 may allow I/O requests to be processed for a time period with the current queue depth settings in effect. The time period may be characterized as an observation period. The observation period may be, for example, 20 seconds. At step 306, a determination is made as to whether the observation period has ended. If not, processing waits at step 306 until the observation period has ended. When step 306 evaluates to yes, control proceeds to step 308 to obtain the observed performance metrics. In step 308, the main control component 46 may invoke the performance monitoring component 32 to obtain the performance data for the current observation period associated with the current queue depth setting for each I/O class. In one embodiment as described herein, the driver 50 may collect the performance data and communicate such data to the main control component or another component for further processing. In a multiprocessor environment, step 308 processing may include obtaining the performance data for all processors using any one of a variety of different techniques. At step 310, the performance goals are evaluated in light of the currently observed performance metrics. Step 310 processing may include the main control component communicating with goal evaluation component to determine if the current performance goals for the I/O classes of the currently executing policy have been met. Step 310 processing may also include determining whether there has been a failure to meet the performance goals within a specified window of time (e.g., if the window of time has lapsed and the performance goals have not been met). At step 312, a determination is made as to whether any adjustment to the current settings affecting the I/O processing is needed. Adjustments may not be needed, for example, if the performance goals have been met or if there has been a failure to meet the current performance goals in a specified time period. If step 312 evaluates to no, control proceeds to step 306 to wait for the end of the next observation period. If step 312 evaluates to yes, control proceeds to step 314 to determine and apply the adjusted settings. Step 314 causes the adjusted settings to become the currently active settings for the I/O classes of the running policy. Control then proceeds to step 306.

In a multiprocessor environment, one processor may be designated to execute the limit control method and determine the limit value for each I/O class. The one processor may then communicate these values to the other processors for use over the interprocessor bus, such as illustrated by 106 of FIG. 2. In the event that the processor currently executing the control method fails or is otherwise unable to execute the limit control method, any one of a variety of different failover techniques may be used to select another processor to execute the limit control method.

Figure 6:
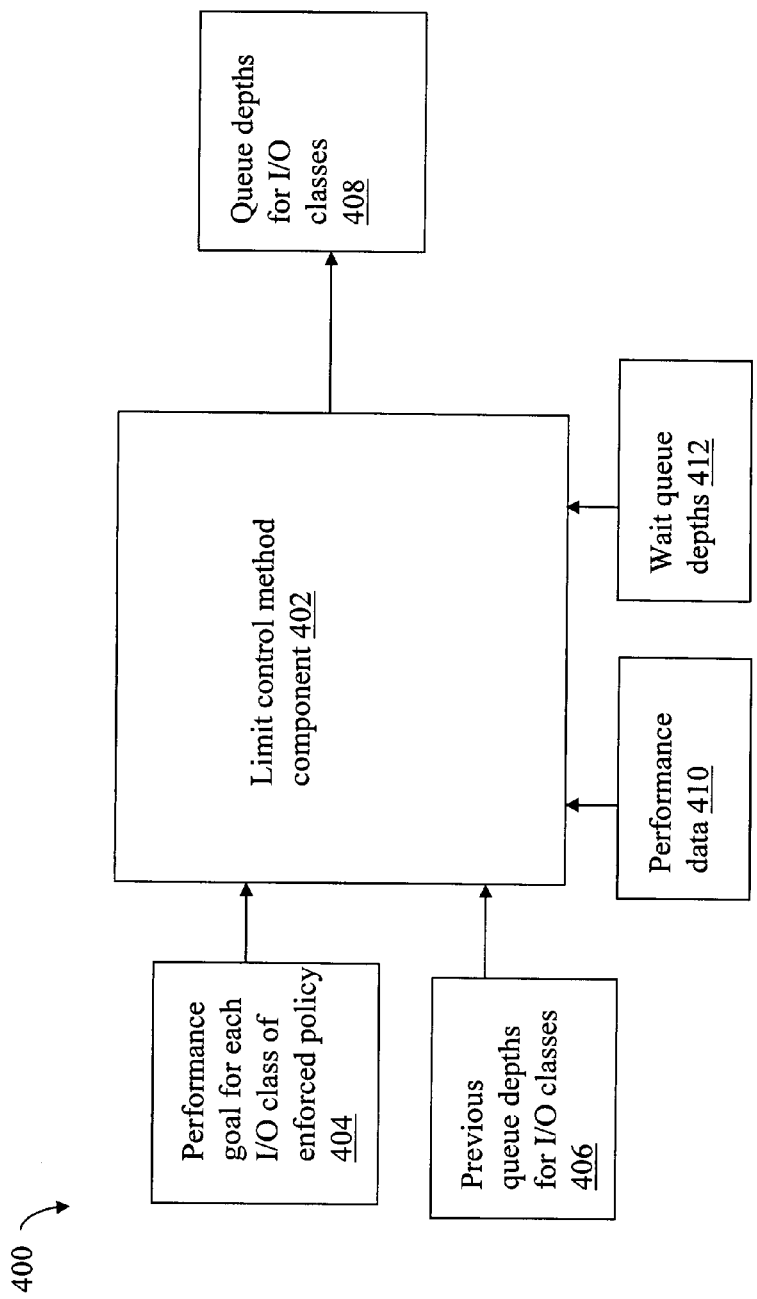
FIG. 6 is a block diagram illustrating various inputs and outputs in connection with the limit control method.

Referring now to FIG. 6, shown is a representation of the inputs and outputs of an embodiment of the limit control method. In the example 400, the limit control method component uses inputs including the performance goal for each I/O class of the currently enforced policy 404, previous queue depths for the I/O classes 406, performance data 410 and wait queue depths 412. The input 406 is used in connection with determining queue depths other than the initial set of queue depths. The performance data 410 may include the observed performance data gathered during an observation period with a current set of queue depths in effect. The wait queue depths 412 indicate the size of the wait queue for each I/O class. The wait queue depth for an I/O class may be determined as an average size of the number of requests in that I/O class queued or waiting for service during an observation period. Rather than determine the wait queue depth as an average value, an embodiment may also determine the wait queue depth of an I/O class as the high water mark or maximum number of I/O requests waiting to be serviced during an observation period. Rather than maintain a value indicating each wait queue depth, an embodiment using the techniques herein may also utilize a boolean indicator which is true (e.g., =1) when any one or more I/O requests are queued. Otherwise, the indicator may be false (e.g., =0) As an output, the component 408 determines a set of queue depths for the I/O classes of the currently enforced policy. It should be noted that an embodiment of the component 402 may also utilize other inputs and generate other outputs than as illustrated in the example 400.

With reference to step 304 of FIG. 5, the initial queue depths are determined and applied for use with the current I/O classes. An embodiment of the limit control method may generate an initial set of queue depths for the I/O classes so that the sum of the queue depths for all the I/O classes is less than or equal to the number of processes that may execute at a point in time to service I/O requests. This may be represented as:

$$\sum_{i=1}^{n}$$

number of processes for I/O class i ≦ number of processes servicing all I/O requests In one embodiment, a maximum of 512 processes at any point in time may be available to service I/O requests and the limit control method may set the initial queue depth for each I/O class to be 64 although an embodiment may use any one of a variety of different techniques and initial values for the queue depths. A queue depth for any I/O class in the embodiment described herein may be a value in the range of 1 . . . 512, inclusively.

In this embodiment, the inputs 404, 406, 410 and 412 are not used in determining the initial set of queue depths for the one or more I/O classes of the currently enforced policy. Another embodiment may select a different initial set of queue depths than as described herein.

It should be noted that an embodiment may also utilize partial queue depths so that an I/O class may have a queue depth less than one. In such instances where an I/O class has a queue depth less than 1, an embodiment may insert a delay between I/O request processing of the I/O class. In other words, a delay may occur between when an I/O request of the I/O class is serviced and at most a single I/O request of the class is serviced at a point in time. The partial queue depth indicates that at most one I/O request of the I/O class is serviced at a time and there is at least one point in time during a defined time period at which there is no I/O request of the I/O class being serviced. The longer the delay, the longer the amount of time that occurs during the time period when there is no I/O request of the I/O class serviced.

It should be noted that for purposes of illustrating the techniques herein, a queue depth value for an I/O class may be in the range of 1 . . . 512, inclusively. If the embodiment uses partial queue depths, the value may be in the range of 0 . . . 521, inclusively so that values 0 . . . 9, inclusively represent a partial queue depth value and a non-partial queue depth is represented as a mapped value in the range of 10 . . . 521, inclusively. When performing processing steps, the limit control method may use a value in the range of 0 . . . 521 which is mapped to the actual queue depth values used for the I/O processing. The mapping may be performed as a last step by the limit control method so that for any queue depth value in the inclusive range of 0 . . . 9, a delay time is calculated and utilized in scheduling. If the queue depth value is in the inclusive range of 10 . . . 521, 9 is subtracted to determine the actual queue depth value generated as the output of the control method.

It should be noted that the value of 512 as well as the number of partial queue depths and techniques for mapping may vary with embodiment. The particular values used in the exemplary embodiments are selected for purposes of illustration of the techniques herein and should not be construed as a limitation.

Once the initial set of queue depths are determined for the I/O classes, the initial set of queue depths are placed into effect and used in connection with processing I/O requests for an observation period. In one embodiment, the observation period may be 20 seconds although other values may be used.

After an observation period has passed, performance data is obtained as in step 308 of FIG. 5 for the observation period. The performance data may include the actual observed performance metric (e.g., throughput, bandwidth, and/or response time) for each I/O class. What will now be described is how an embodiment of the limit control method may evaluate and perform adjustments to a current queue depth for an I/O class based on the actual observed performance data. The processing steps of the limit control method are set forth in flowcharts and may be performed at part of steps 310, 312 and 314 processing of FIG. 5 every observation period.

Figure 7A:
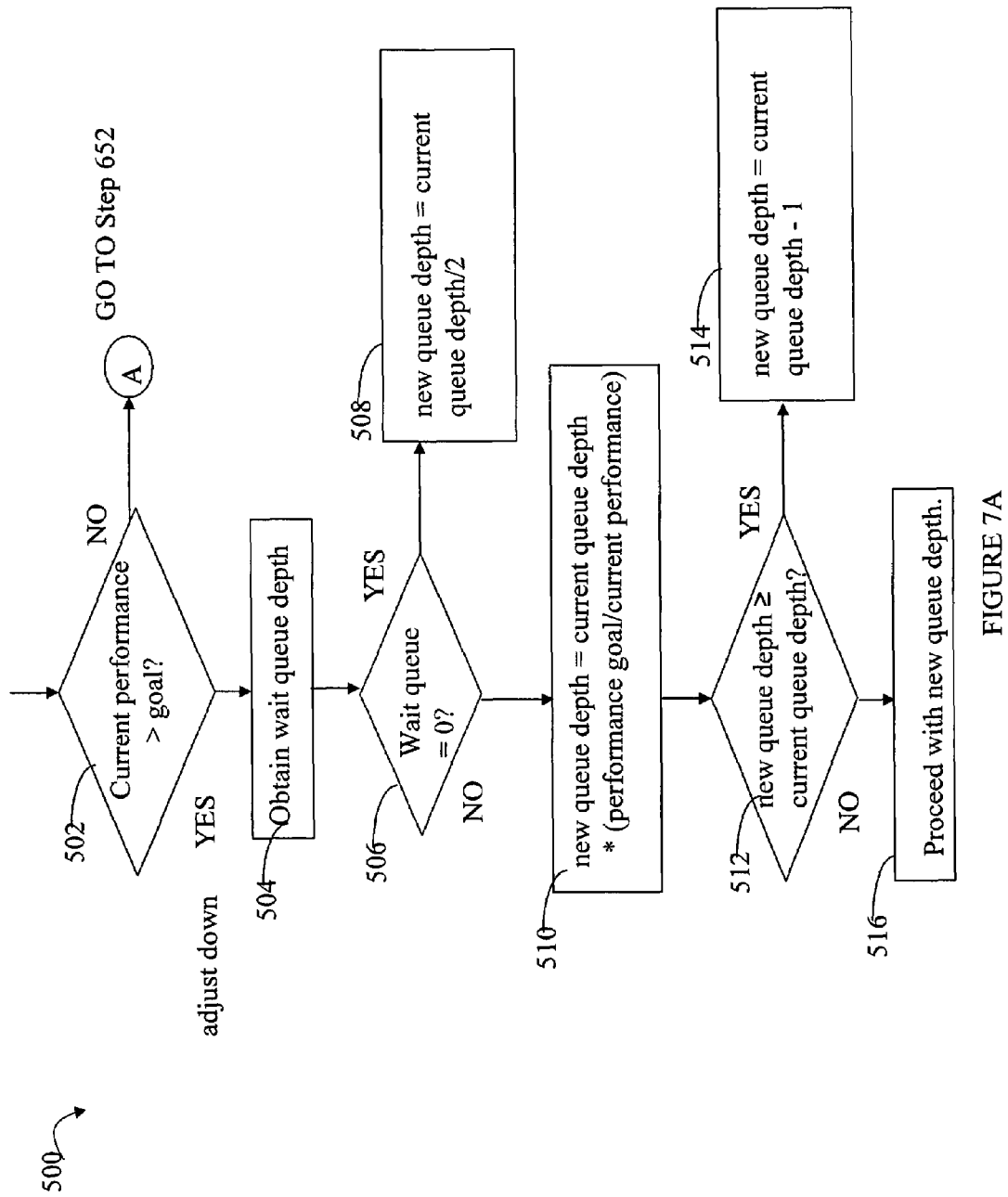
FIGS. 7A, 7B, 7C, 8, 9A, 9B, and 10 are flowcharts of processing steps that may be performed in an embodiment of the limit control method.

Referring now to FIG. 7A, shown is a flowchart of processing steps of an embodiment of the limit control method. The processing steps are described with respect to evaluating and making adjustments with respect to a queue depth for a single I/O class. The processing steps of 500 may be performed with respect to each I/O class of the currently enforced policy. The variable new queue depth represents the new queue depth currently being calculated. The current queue depth represents the current queue depth for the I/O class. At step 502, a determination is made as to whether the current performance as determined using the observed performance data is greater than the goal. For example, an I/O class may specify a throughput goal metric and the current throughput is compared to the throughput goal metric for the I/O class in step 502. If step 502 evaluates to no, control proceeds to step 652 where the queue depth may be adjusted upward. If step 502 evaluates to yes, it means that more resources are being utilized for the I/O class than desired so that the queue depth may be decreased to accordingly reduce the amount of resources of the data storage system for processing I/O requests of the I/O class. At step 504, the wait queue depth for the current I/O class is obtained. The wait queue depth may be a computed size or depth of the queue of I/O requests classified as belonging to the I/O class waiting to be processed, for example, as illustrated in FIG. 4, elements 76a-76n. A determination is made at step 506 as to whether the wait queue depth is zero, meaning that no I/O request of the current I/O class had to wait for processing. If step 506 evaluates to yes, control proceeds to step 508 where the new queue depth is assigned to be the current queue depth/2. It should be noted that the amount by which the queue depth is adjusted in step 508 may be tuned for a particular data storage system and applications executing therein. The queue depth may be adjusted in smaller increments, such as dividing by 3 or 4, or larger amounts depending on the sensitivity and variation within the data storage system. If step 506 evaluates to no, control proceeds to step 510 where the new queue depth is determined based on the following relationship:

$$\frac{\text{queue depth } A}{\text{performance } A} = \frac{\text{queue depth } B}{\text{performance } B} \qquad \text{EQUATION 1}$$

The foregoing is a ratio representing a linear relationship between the amount of resources and performance. If the current amount of resources allocated for an I/O class (e.g. current queue depth as represented by A) is increased or decreased by an amount (adjusted queue depth as represented by B), the above expresses that the performance will also, respectively, increase or decrease linearly. The foregoing is used to determine an amount of adjustment to the current queue depth in step 510 as:

new queue depth=current queue depth*(performance goal/current performance).

At step 512, a determination is made as to whether the new queue depth is greater than or equal to the current queue depth. If step 512 evaluates to yes, control proceeds to step 514 where the new queue depth is determined as the current queue depth—1. If step 514 evaluates to no, control proceeds to step 516 where the new queue depth is used without further modification.

Figure 7B:
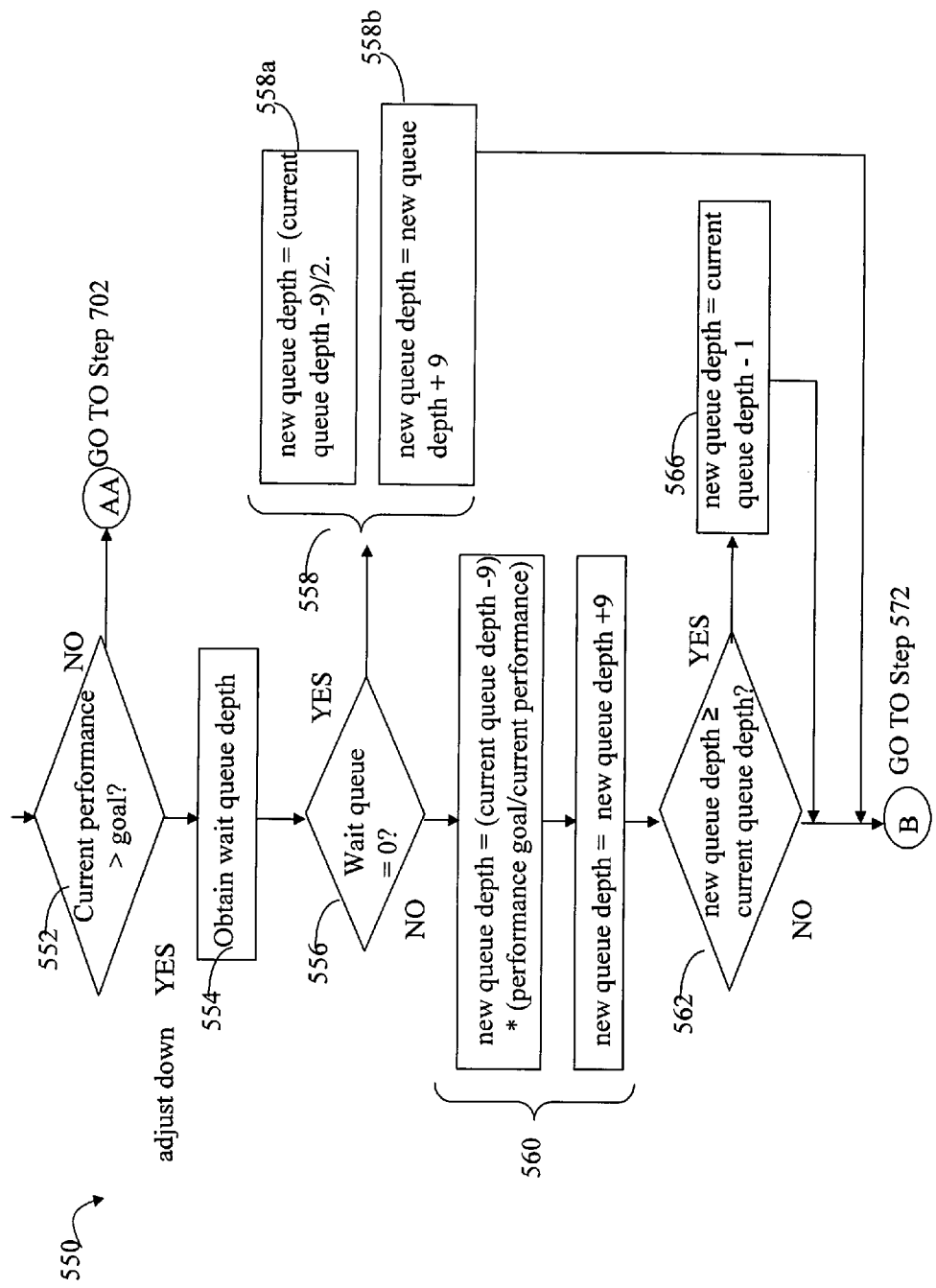
Figure 7C:
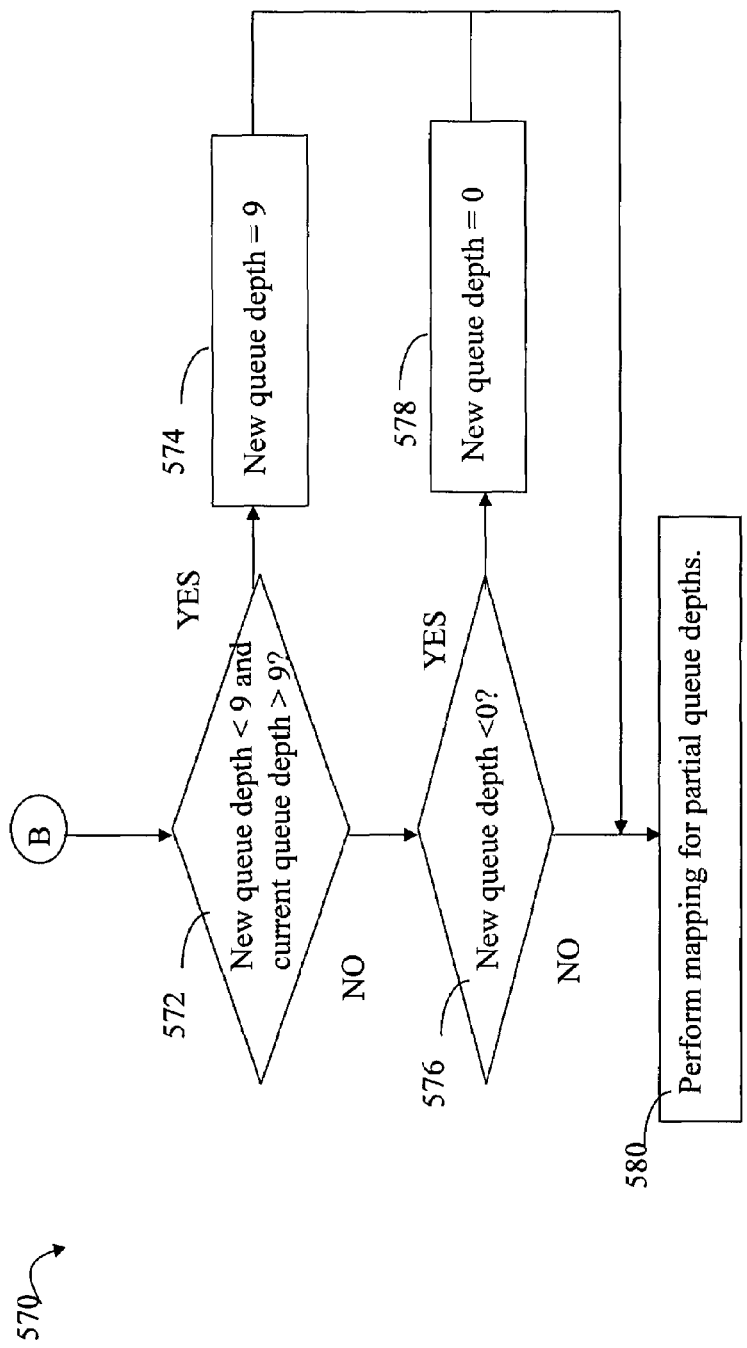

The processing steps of the flowchart 500 set forth steps that may be used in an embodiment that does not have partial queue depths. Referring now to FIGS. 7B and 7C, shown are flowcharts with processing steps that may be performed in an embodiment utilizing partial queue depths as described herein. With respect to FIG. 7A, FIGS. 7B, 7C perform additional processing to handle partial queue depths. When performing calculations, values in the range of 0 . . . 521 are scaled down or mapped to values in the range of 1 . . . 512. The FIGS. 7B, 7C also include additional processing steps to handle special case considerations for partial queue depths.

Steps 552, 554, 556, 562 and 566 are respectively similar to steps 502, 504, 506, 512 and 514 of FIG. 7A. If step 552 evaluates to no, control proceeds to step 702 for processing with partial queue depths rather than step 652 for processing steps without partial queue depths. Rather than perform step 508 of FIG. 7A, step 558 of FIG. 7B is performed. Rather than perform step 510 of FIG. 7A, step 560 of FIG. 7B is performed. If step 556 evaluates to yes, control proceeds to step 558 where the new queue depth is determined using steps 558a and 558b. In step 558a, the new queue depth=(current queue depth−9)/2 and in step 558b, the new queue depth=new queue depth+9, to scale the new queue depth back to a value in the range of 0 . . . 521. From step 558, control proceeds to step 572. If step 556 evaluates to no, control proceeds to step 560 where the new queue depth=(current queue depth−9)* (performance goal/current performance). Then the new queue depth=new queue depth+9. Steps 562 and 566 are as described in connection with FIG. 7A. After performing step 566 as well as when step 562 evaluates to no, control then proceeds to step 572. Steps 572, 574, 576, and 578 handle additional processing for partial queue depths. If the new queue depths is less than 9 (partial queue depth) and the current queue depth is >9 (not a partial queue depth), control proceeds to step 574 where the new queue depth=9. Control proceeds to step 580. If step 572 evaluates to no, control proceeds to step 576 where a determination is made as to whether the new queue depths is <0. If so, control proceeds to step 578 where the new queue depth=0. Control then proceeds to step 580. If step 576 evaluates to no, control proceeds to step 580.

At step 580, processing is performed to map the new queue depth value which is in the inclusive range of 1 . . . 521. As described elsewhere herein in more detail, if the new queue depth is a value in the inclusive range of 10 . . . 521, the new queue depth is mapped, respectively, to a value in the inclusive range of 1 . . . 512. If the new queue depth is a value in the inclusive range of 0 . . . 9, a delay time for a partial queue depth may be determined in accordance with the new queue depth value.

Figure 8:
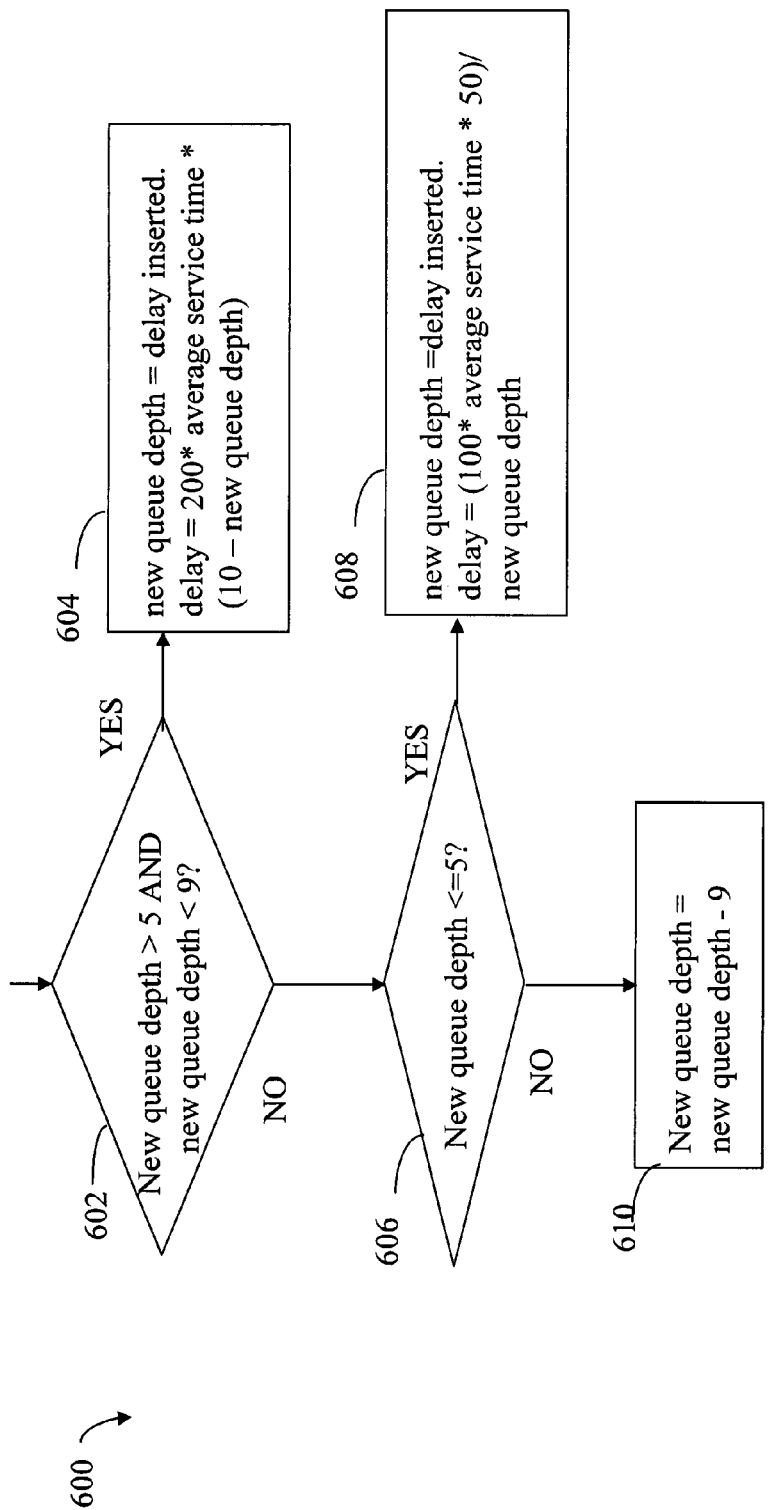

Referring now to FIG. 8, shown is a flowchart of processing steps that may be performed to determine the actual new queue depth. The example 600 illustrates additional detail of processing of step 580 to either map the new queue depth from a value in the inclusive range of 10 . . . 521 to a value in the inclusive range of 1 . . . 512, or otherwise to determine a delay time for a partial queue depth represented if the new queue depth value is in the inclusive range of 0 . . . 9. A determination is made at step 602 as to whether the new queue depth is greater than 5 and also less than 9. If so, control proceeds to step 604. At step 604, a delay time is determined. In this embodiment, the delay is determined as:

2*100*average service time*(10−new queue depth)

where average service time is the average amount of time it takes to service an I/O request of the I/O class during the current observation period. In one embodiment, the average service time may not include any waiting period. The average service time may measure the average amount of time it takes to service or process an I/O request as determined by the driver without any added delays due to policy enforcement. The response time may be defined as the service time plus any waiting time or delay incurred due to policy enforcement. For example, response time includes the additional time incurred because of delays for fractional queue depth, and any time spent waiting in the outstanding I/O queue for processing. In this example, the average service time may be in microseconds and the delay time expressed in milliseconds so the value of 100 in the numerator is used to convert the service time units to the proper delay time units. If step 602 evaluates to no, control proceeds to step 606 where a determination is made if the new queue depth is less than or equal to 5. If so, control proceeds to step 608 where the delay is determined as:

100*average service time*50/new queue depth

If the new queue depth is 0, a value of 0.5 may be used to avoid a division by zero. Similar to step 604, the value of 100 is used to convert the average service time units to the proper delay time units. If step 606 evaluates to no (i.e., no partial queue depths), then control proceeds to step 610 where the new queue depth is determined as the new queue depth−9.

Steps 604 and 608 calculate a delay time based on the partial queue depth which is represented by a current value for new queue depth in the inclusive range 0 . . . 9. For values 6 . . . 9, inclusively, step 604 determines a delay time which increases as the new queue depth value decreases. Similarly, step 608 determines a delay time which increases as the new queue depth values decreases for new queue depth values less than 6.

What will now be described is processing that may be performed in connection with increasing the queue depth.

Figure 9A:
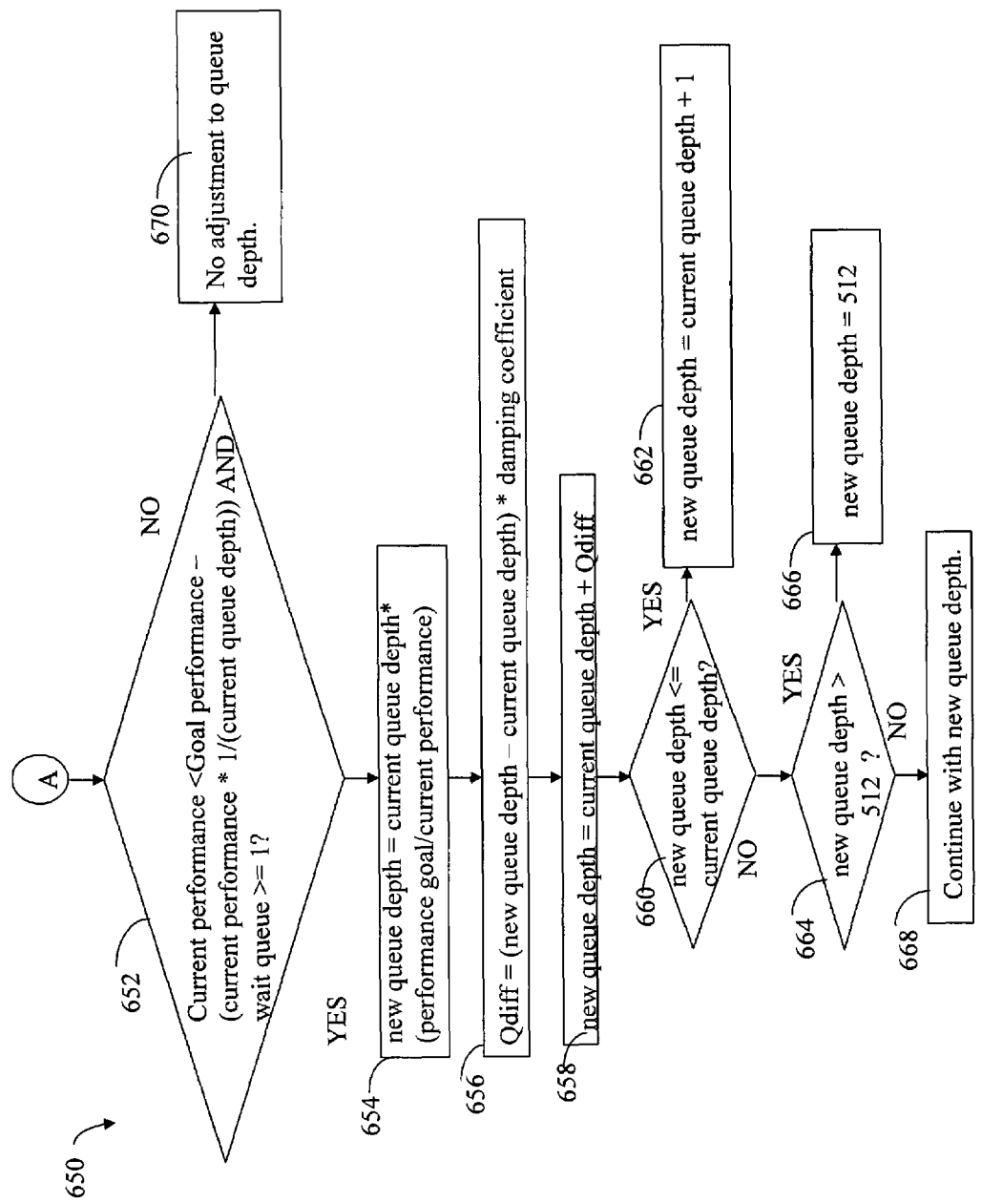

Referring now to FIG. 9A, shown is a flowchart of processing steps that may be performed to possibly increase the queue depth in an embodiment which does not have partial queue depths. The flowchart 650 processing is performed when step 502 of FIG. 7A evaluates to no. At step 652, a determination is made as to whether to adjust the current queue depth. At step 652, a determination is made as to whether any I/O requests have had to wait and whether the current performance is sufficiently close to the performance goal that the current queue depth does not need to be adjusted. In this embodiment, the determination as to whether the current performance is sufficiently close, or within a specified tolerance, is represented as:

Current performance<Goal performance−(current performance*1/(current queue depth))

The foregoing is logically ANDed with the condition "wait queue>=1" at step 652.

It should be noted that an embodiment may vary the quantity "1/current queue depth" in order to vary the tolerance that may be acceptable with a particular embodiment.

If step 652 evaluates to no, control proceeds to step 670 where there is no adjustment to the queue depth based on the current observation period performance. If step 652 evaluates to yes, control proceeds to step 654 where the new queue depth is determined as:

new queue depth=current queue depth(performance goal/current performance)

based on the EQUATION 1 described above. Control proceeds to step 656 where the different Qdiff is determined as:

Qdiff=(new queue depth−current queue depth)*damping coefficient where the damping coefficient is some value selected to affect the amount by which the queue depth is incremented. In one embodiment, the damping coefficient selected may be 0.5. A larger damping coefficient may be selected, for example, to increase the rate at which the queue depth value converges to achieve the selected performance goal. The damping coefficient may be constant numeric value selected as a factor affecting the rate at which the queue depth is incremented. At step 658, new queue depth is determined as:

new queue depth=new queue depth+Qdiff

At step 660, a determination is made as to whether new queue depth is less than or equal to the current queue depth. If so, control proceeds to step 662 where the new queue depth is determines the current queue depth+1. If step 660 evaluates to no, control proceeds to step 664 where a determination is made as to whether the new queue depth is greater than 512. If so, new queue depth is assigned the value 512. Step 664 ensures that the newly determined queue depth is not out of range. If step 664 evaluates to no, control proceeds to step 668 to continue processing with the new queue depth.

Figure 9B:
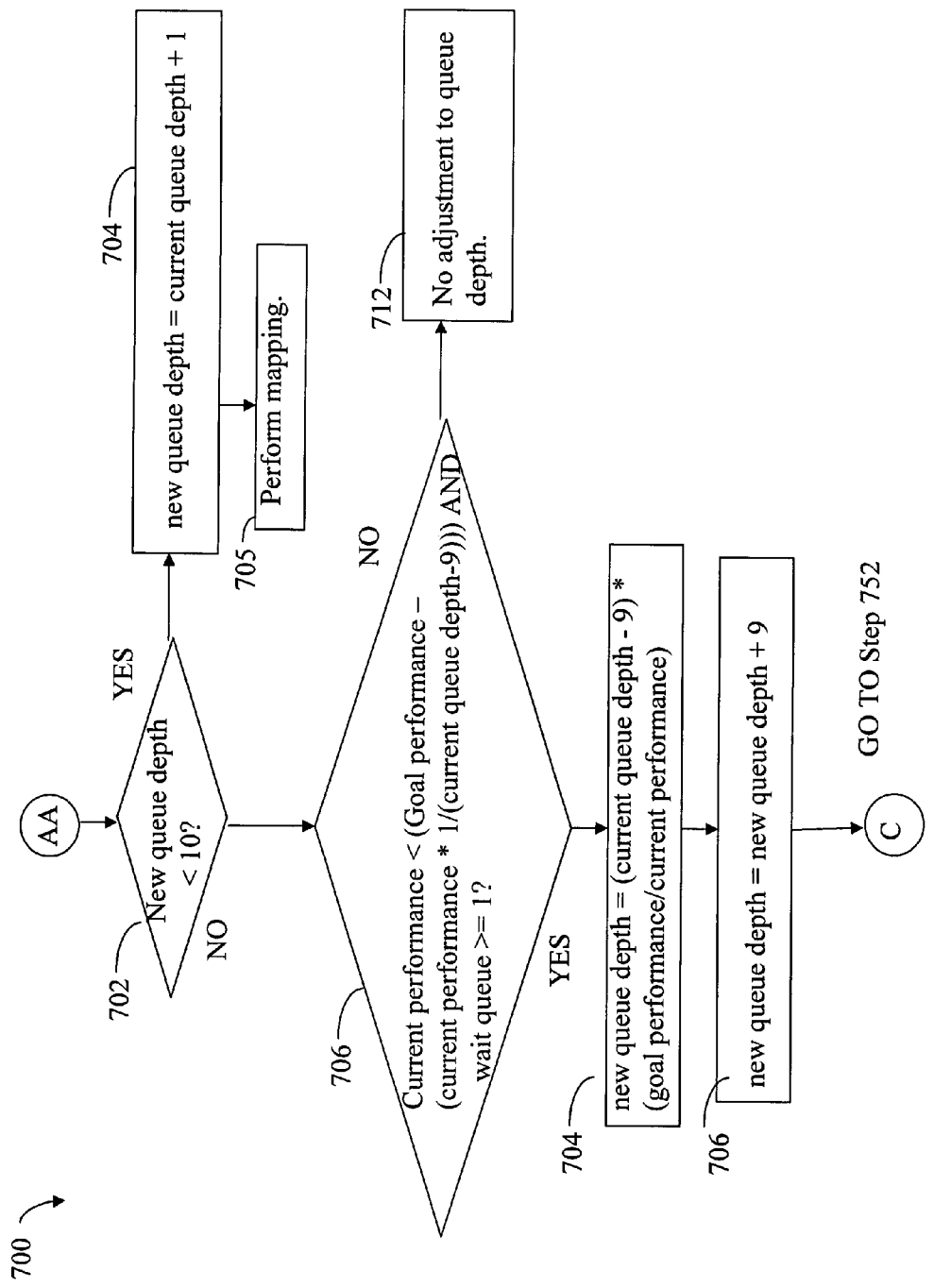
Figure 10:
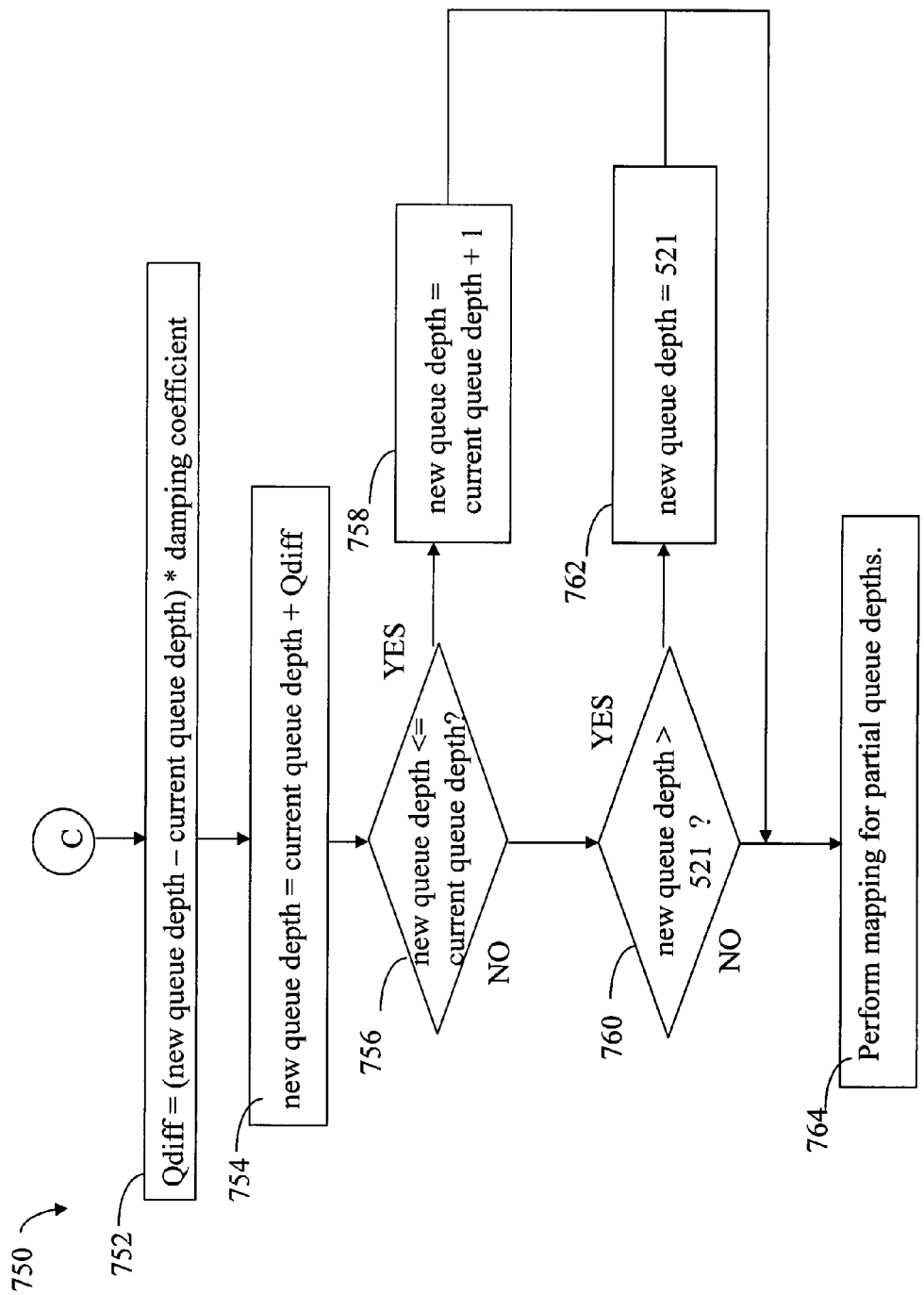

Referring now to FIG. 9B, shown is a flowchart of processing steps that may be performed to possibly increase the queue depth in an embodiment which utilizes partial queue depths. The flowchart 700 processing is performed when step 552 of FIG. 7B evaluates to no. At step 702, a determination is made as to whether the new queue depth represents a partial queue depth. If so, control proceeds to step 704 where the new queue depth is determined as current queue depth+1. Control then proceeds to step 705 to perform the processing of the flowchart of FIG. 8 where, if the new queue depth value is a value in the inclusive range 10 . . . 521, the new queue depth is mapped to a value in the range of 1 . . . 512. Otherwise, if the new queue depth is a value in the range of 0 . . . 9, a mapped value of a partial queue depth is determined.

If step 702 evaluates to no, control proceeds to step 706. Processing steps 706 and 712 are respectively similar to steps 652 and 670 of FIG. 9A. If step 706 evaluates to no, control proceeds to step 704. Steps 704 and 706 are performed in place of step 654 of FIG. 9A. Step 704 determines the new queue depth as:

new queue depth=(current queue depth−9)*(goal performance/current performance)

and step 706 determines new queue depth as:

new queue depth=new queue depth+9.

Control proceeds to step 752. Steps 752, 754, 756, 758, 760, and 762 are respectively similar to steps 656, 658, 660, 662, 664 and 666 of FIG. 9A.

After completing any one of steps 758, 762, and step 760 evaluating to no, control proceeds to step 764 to perform mapping for the partial queue depths. Step 764 invokes the processing steps of FIG. 8 the new queue depth value is either mapped to a value in the range of 10 . . . 521 or otherwise where a delay time is determined for a partial queue depth represented by a new queue depth value of 0 . . . 9.

Figure 11:
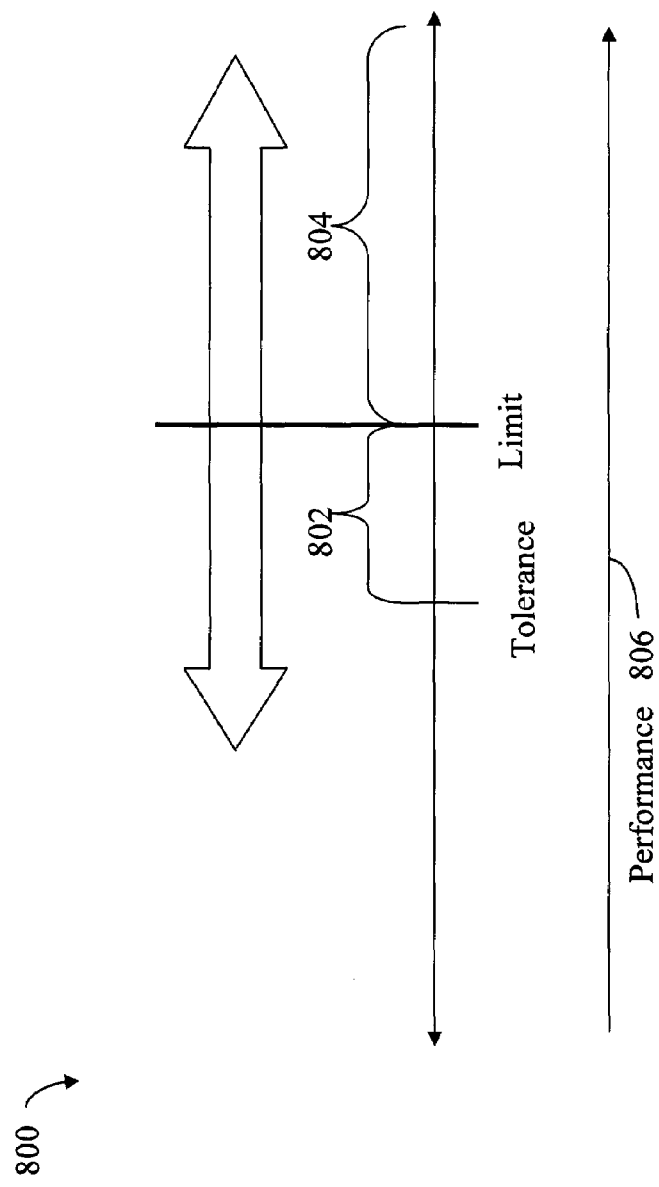
FIG. 11 is an example illustrating use of the limit technique and an associated tolerance value used in connection with determining when adjustments are made to a current queue depth for an I/O class.

Referring now to FIG. 11, shown is an illustration 800 of the limit and associated tolerance. The limit control method strives to achieve an observed or actual performance goal within the area illustrated by 802. The limit control method adjusts the queue depth to control the performance of an I/O class to be within the range of 802. If the performance (as indicated by the selected performance metric) is less than the range of 802, the queue depth may be increased in order to increase the performance for the I/O class. By increasing the queue depth, additional data storage system resources are allocated for use in connection with processing I/O requests of the I/O class. As additional resources are allocated, performance also increases as indicated by 806. If the performance is within the range 802, no adjustments are made to the queue depth. If the performance is within area 804 or greater than the limit, the queue depth may be decreased in order to decrease the performance for the I/O class. By decreasing the queue depth, additional data storage system resources are deallocated from use in connection with processing I/O requests of the I/O class.

As described herein, a number of requests of the I/O class to be processed concurrently may be determined to achieve the performance goal so that an observed performance value for the I/O class does not exceed the performance goal and is within a specified range. If the limit specifies an upper bound for a particular metric, a performance goal may be achieved if the observed performance value falls within a range of one or more values equal to or less than the limit, and if the limit is a minimum value, the performance goal may be achieved if the observed performance value falls within a range of one or more values equal to or greater than the limit.

The relationship of EQUATION 1 expresses the concept that by increasing/decreasing the queue depth, the performance of I/O requests in the I/O class also respectively increases/decreases in an approximately linear relationship with added compensation as described herein, for example, with use of the damping coefficient.

The foregoing techniques allow a user to specify service levels or performance goals on a per application basis by profiling the I/O requests of each application. Each application profile is used to define an I/O class characterizing the I/O requests of the application received at the data storage system. The foregoing allows the user to specify performance goals using a numeric value functioning as a limit used with the limit method.

As described herein, an embodiment may further tune values used in connection with the damping coefficient (e.g., step 656, 752), the amount by which the queue depth is adjusted upward (e.g., quantity "queue depth/2" in step 508, "(queue depth−9)/2" in step 558a), and the tolerance (as represented by the quantity "1/current queue depth" in step 652 and "1/(current queue depth−9)" in step 706). The foregoing techniques determine an adjustment (increase or decrease) based on the linear relationship of EQUATION 1. An embodiment may also utilize any number of partial queue depths for which a delay may be determined. The partial queue depth may be implemented by inserting delays between when any single I/O request of that class may be serviced. The foregoing techniques may be used to optimize performance of a data storage system using the limit control method which stops adjusting the queue depth when observed performance is at or below a goal but within a specified tolerance. If the observed performance exceeds the goal, the queue depth is decreased to accordingly decrease or lower the observed performance for the I/O class. It should be noted that as illustrated in FIG. 11, the tolerance only applies to observed performance below the goal functioning as the limit. If performance exceeds this limit, the queue depth is adjusted to decrease the observed performance.

As described herein, queue depth refers to the number of concurrent I/O requests that the storage system is allowed to process for a given I/O class. As the queue depth value increases, the capacity to process I/O for the I/O class increases, which increases performance for the associated I/O class. The limit control method described herein manipulates the queue depth as a means to control concurrent I/O processing in order to satisfy I/O class goals. Therefore, depending on the number of I/O requests that the storage system processes, the control method accordingly adjusts and adapts the applicable queue depth values in order to satisfy the specified goals. The limit control method described herein may adjust the queue depth as needed in accordance with changes in current workload of I/O requests to maintain specified performance goals.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method for controlling performance of a data storage system comprising:
   receiving a performance goal specifying a limit for an I/O class; and
   determining a number of requests of the I/O class to be processed concurrently to achieve the performance goal so that an observed performance value for the I/O class does not exceed the performance goal, wherein if the limit is a upper bound, the observed performance value falls within a range of one or more values equal to or less than the limit, and if the limit is a minimum value, the observed performance value falls within a range of one or more values equal to or greater than the limit.

2. The method of claim 1, wherein a plurality of I/O classes are defined, one or more of the plurality of I/O classes each having an associated performance goal.

3. The method of claim 2, further comprising:
   performing the determining step for each of the one or more I/O classes to determine a number of requests to be serviced concurrently for each I/O class.

4. The method of claim 1, further comprising:
   receiving performance data for a time period;
   determining the observed performance value for the time period; and
   evaluating, in accordance with the observed performance value, whether the performance goal is achieved.

5. The method of claim 4, further comprising:
   determining whether the observed performance value is greater than the performance goal;
   if the observed performance value is greater than the performance goal, decreasing the number of requests of the I/O class to be processed concurrently.

6. The method of claim 5, wherein, if no I/O requests of the I/O class had to wait to be serviced, the number of requests of the I/O class to be processed concurrently is selected to be half of the current number of the requests to be processed concurrently for the I/O class.

7. The method of claim 5, if one or more I/O requests of the I/O class had to wait to be serviced, a current value, current queue depth, of the number of requests of the I/O class to be processed concurrently, is adjusted to produce a new queue depth represented as:

new queue depth=current queue depth*(performance goal/observed performance value).

8. The method of claim 5, wherein the number of requests of the I/O class to be processed concurrently to achieve the performance goal is selected from a range of values including at least one value representing a partial queue depth, the partial queue depth indicating that at most one I/O request of the I/O class is serviced at a time and there is at least one point in time during a defined time period at which there is no I/O request of the I/O class being serviced.

9. The method of claim 8, wherein the partial queue depth is implemented by inserting one or more delays between a first time and a second time when an I/O request of the I/O class is serviced, wherein if a first partial queue depth is smaller than a second partial queue depth, the first partial queue depth results in a longer delay than the second partial queue depth.

10. The method of claim 9, wherein an amount of delay for a partial queue depth is determined in accordance with an average service time for processing an I/O request of the I/O class.

11. The method of claim 4, further comprising:
determining whether the observed performance value is greater than the performance goal; and
if the observed performance value is not greater than the performance goal, increasing the number of requests of the I/O class to be processed concurrently if the observed performance value for the I/O class does not fall within the range of one or more values equal to or less than the performance goal and at least one I/O request of the I/O class had to wait to be processed.

12. The method of claim 11, wherein, a current value of the number of requests of the I/O class to be processed concurrently is represented as current queue depth, and the current queue depth is increased to generate a new queue depth represented as:

new queue depth=current queue depth+{[current queue depth*(performance goal/current performance)]−current queue depth}*damping coefficient, wherein the damping coefficient is a numeric value affecting an increase to the current queue depth.

13. The method of claim 11, wherein the number of requests of the I/O class to be processed concurrently to achieve the performance goal is selected from a range of values including at least one value representing a partial queue depth, the partial queue depth indicating that at most one I/O request of the I/O class is serviced at a time and there is at least one point in time during a defined time period at which there is no I/O request of the I/O class being serviced.

14. The method of claim 13, wherein the partial queue depth is implemented by inserting one or more delays between a first time and a second time when an I/O request of the I/O class is serviced, wherein if a first partial queue depth is smaller than a second partial queue depth, the first partial queue depth results in a longer delay than the second partial queue depth.

15. The method of claim 14, wherein an amount of delay for a partial queue depth is determined in accordance with an average service time for processing an I/O request of the I/O class.

16. The method of claim 1, wherein the performance goal is a quantity representing one of: bandwidth, throughput, and response time.

17. The method of claim 16, wherein response time is the average time for a request to be serviced by the data storage system including any waiting time, bandwidth is an average amount of data in connection with read and/or write I/O requests processed by the data storage system per unit of time, and throughput is an average number of I/O requests serviced by the data storage system per unit of time.

18. A data storage system comprising executable code stored on a computer readable medium for controlling performance of the data storage system, the computer readable medium comprising executable code stored thereon for:
receiving a performance goal specifying a limit for an I/O class;
determining a number of requests of the I/O class to be processed concurrently to achieve the performance goal so that an observed performance value for the I/O class does not exceed the performance goal, wherein if the limit is a upper bound, the observed performance value falls within a range of one or more values equal to or less than the limit, and if the limit is a minimum value, the observed performance value falls within a range of one or more values equal to or greater than the limit; and
adjusting the number of requests of the I/O class to be processed concurrently in accordance with subsequently observed performance values and the performance goal to maintain the performance goal.

19. A computer readable medium comprising executable code stored thereon for controlling performance of a data storage system, the computer readable medium comprising executable code stored thereon for:
receiving a performance goal specifying a limit for an I/O class; and
determining a number of requests of the I/O class to be processed concurrently to achieve the performance goal so that an observed performance value for the I/O class does not exceed the performance goal, wherein if the limit is a upper bound, the observed performance value falls within a range of one or more values equal to or less than the limit, and if the limit is a minimum value, the observed performance value falls within a range of one or more values equal to or greater than the limit.

20. The computer readable medium of claim 19, wherein each of one or more different I/O classes specify different limit values, and said executable code for determining is executed for each of the one or more different I/O classes to determine a number of requests to be serviced concurrently for said each I/O class.

* * * * *